May 11, 1954          G. HERZOG          2,678,397
METHOD OF AND APPARATUS FOR EXPLORING RADIOACTIVE STRATA
Filed Oct. 21, 1950
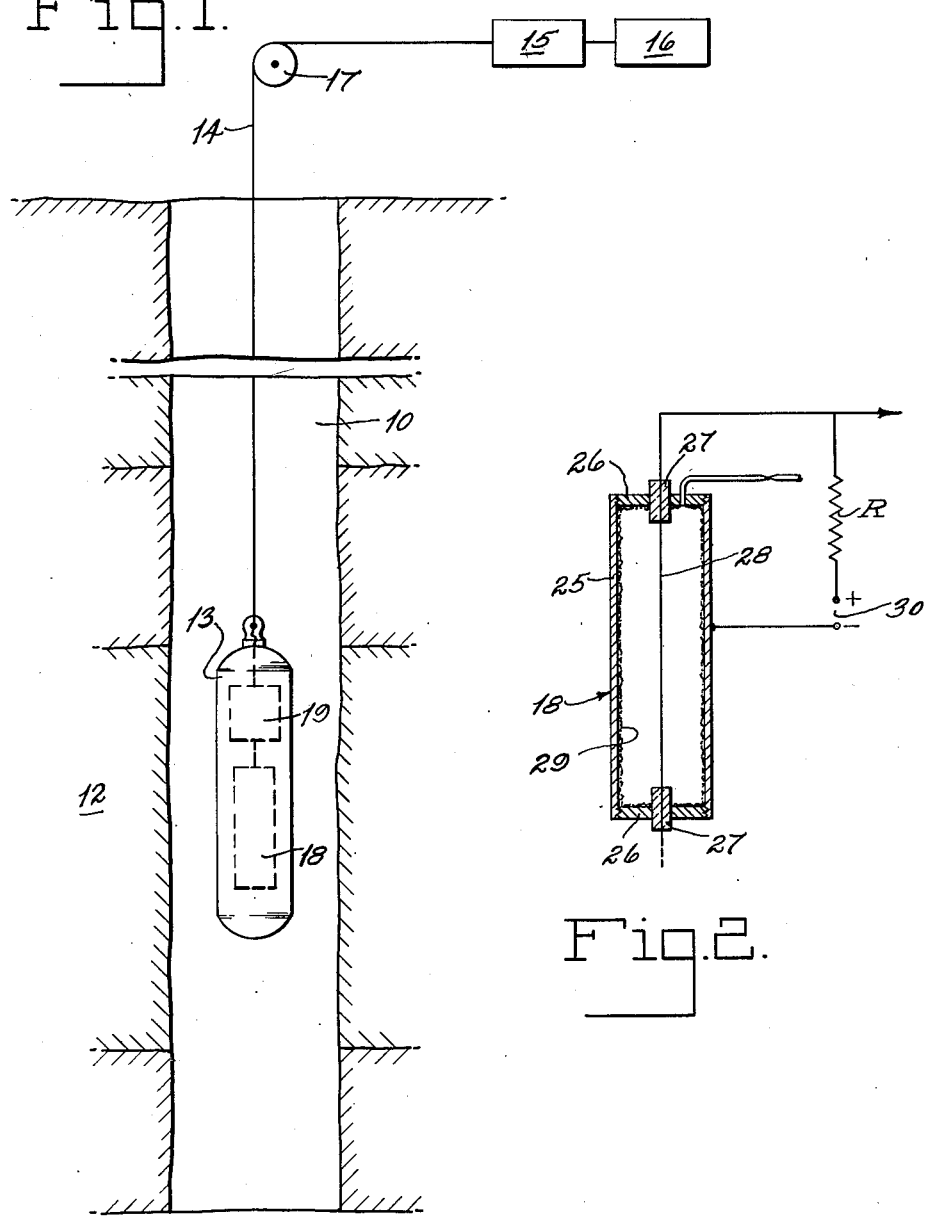
INVENTOR.
GERHARD HERZOG Patented May 11, 1954

2,678,397

UNITED STATES PATENT OFFICE 2,678,397

METHOD OF AND APPARATUS FOR EXPLORING RADIOACTIVE STRATA

Gerhard Herzog, Houston, Tex., assignor to The Texas Company, New York, N. Y., a corporation of Delaware Application October 21, 1950, Serial No. 191,334

8 Claims. (Cl. 250—83.6)

This invention relates to a method of, and apparatus for, exploring radioactive strata and particularly those from which there is emanation of gamma radiation of different degrees of energy. The invention is particularly concerned with differentiating between gamma rays of different energy levels.

The invention broadly contemplates a method of discriminating or differentiating between gamma rays of a selected high level of energy and gamma rays of lower energy level by placing in close proximity to the strata being explored a substance which reacts with gamma rays of the selected high energy level to produce ionizing particles, the substance being substantially insensitive toward gamma rays of lower energy level. The resulting ionizing particles are subjected to contact with an ionizable medium in an electrical field under the influence of a high electrical potential whereby electrical pulses are created in the ionizable medium, and pulses whose magnitude is indicative of the quantity of the aforesaid high energy gamma radiation are measured.

The invention contemplates an apparatus for carrying out the aforesaid method of exploration. In accordance with the invention, there is passed in close proximity to the strata being explored a radioactive detector device comprising a cathode envelope containing ionizable gas of relatively low density and having in its interior a substance which reacts with the gamma rays of selected high energy level but which is substantially insensitive to gamma rays of lower energy level. Deuterium, beryllium-9, and compounds thereof, are examples of effective gamma ray-reactive substances. An anode member extends within the cathode envelope and means are provided for impressing an electrical potential upon the ionizable gas within the envelope. Means are also provided for conducting electrical pulses away from the device and transmitting them to suitable amplifying, receiving and recording mechanisms.

The gamma ray-reactive substance is advantageously disposed in the form of a thin coating over the interior surfaces of the cathode and this coating may have a thickness, for example, of about three mils. Instead of a coating, the desired gamma ray-reactive substance may be in gaseous form and confined within the cathode envelope.

More specifically, the invention contemplates employing a proportional-type of counter which is sensitized with a substance such as deuterium, beryllium-9, or compound thereof, either in the form of a coating or in the form of a gaseous filling. Under the photo-disintegration, protons (in the case of deuterium) and alpha particles (in the case of beryllium-9) are liberated. These liberated particles will produce strong ionization. On the other hand, gamma rays which do not have sufficient energy to produce photo-disintegration will eject some electrons into the volume in the counter in the normal manner. The primary ionization by these electrons is less than that by the protons or alpha particles. Therefore, the electrical discharges in the proportional counter will be larger for the gamma rays which have energies above the critical limit or selected level than for gamma rays with smaller or lower energies. By proper amplifying means, the larger discharges can be separated and counted.

The invention is useful in differentiating between hard and soft gamma rays as, for example, in the surface exploration for sub-surface deposits of radioactive material. For example, gamma rays of widely varying degrees of energy may emanate from formations containing uranium, high energy rays coming from the uranium and its degradation products, and rays of relatively lower energy coming from the surrounding formation. Exploration of such strata or formation with a detector which is sensitive only to the high energy gamma rays thus provides an effective means of determining the location of uranium deposits within the formation.

The invention is also useful in exploring earth bores, such as in oil producing fields, and may be adapted for use in any bore where it is desired to differentiate between hard and soft or between gamma rays of different degrees of energy. For example, in neutron-gamma ray well logging it is desirable to discriminate between the higher energy neutron induced gamma rays, having energies of about 2 m. e. v. (million electron volts), and the lower energy gamma ray radiation which has an average energy of about 1 m. e. v.

In general, it is contemplated detecting gamma rays having energies at least equal to 1.7 m. e. v. In detecting gamma rays of this energy level, the cathode envelope may have its interior surface coated with beryllium-9 or a compound thereof. Gamma radiation above 1.7 m. e. v. reacts with beryllium-9 to produce neutrons and alpha particles, the alpha particles having ionizing power in contradistinction to the neutrons.

In the case of deuterium, gamma radiation having in excess of 2.2 m. e. v. reacts therewith to produce neutrons and protons, the latter having ionizing characteristics, as previously stated.

Accordingly, when detecting gamma radiation having an energy level above 2.2 m. e. v., the interior surface of the cathode envelope is advantageously coated with a material containing deuterium, such as solid deutercarbons or deuterium oxide (heavy water), or the cathode envelope is provided with a content of deuterium gas.

Where it is desired to detect gamma rays of selected and still higher energy levels, other substances may be chosen which are sensitive to the particular gamma rays and substantially non-sensitive to gamma rays of lower energy levels.

In order to illustrate the invention, reference will now be made to the figures of the accompanying drawing, showing in diagrammatic fashion an application of the invention to the exploration of strata in an earth bore.

Figure 1 is a vertical elevation showing somewhat diagrammatically the strata surrounding a portion of a bore hole or well. Figure 2 is a vertical section showing diagrammatically the the radiation detector of the present invention.

Referring to Figure 1, a bore hole 10 is shown as penetrating several underground formations or sub-strata, one of which is indicated at 12. A logging instrument, represented generally by a housing 13 in the form of an elongated capsule, is adapted to be lowered and raised through a hole by means of a suspending cable 14. This cable contains one or more electrical conductors which serve to conduct the output of the instrument to an amplifier 15 at the surface and which is in turn connected to a suitable recorder 16. The cable 14 may also conduct to the instrument in the hole the electric current necessary to energize the elements of which the instrument is comprised. The cable 14 is shown as passing over a pulley or drum 17 which serves to measure the length of the cable and thus the depth of the instrument in the hole, as is well known in the art.

Mounted within the housing 13 is a detecting device 18 advantageously of the proportional counter type as modified in accordance with the present invention. The output of the counter leads to the cable 14 through a suitable linear preamplifier and pulse size selector 19, as indicated by dotted lines.

Figure 2 shows somewhat diagrammatically the cross-section of the detector 18, which is of the proportional counter type. The detector comprises a relatively thin cylinder 25 which may be of brass, this cylinder being provided with upper and lower end closure members 26, preferably provided with circumferential threads so that they may be screwed tightly into the ends of the cylinder 25. These ends may be formed of the same material as the cylinder. Each of the end members is provided with a center opening into which an electrical insulator 27, preferably of glass and of tubular form, is tightly fitted. The cylinder 25 forms the cathode of the counter and a fine wire 28 of about 3 mils diameter stretched between the insulators 27 forms the anode of the counter. The anode is maintained at a positive potential with respect to the cathode and a very high resistance R of the order of one megohm is connected in series with the electrode and a source of high potential 30. The potential difference impressed upon the cathode and anode may be of the order of 1000 volts.

The inner surface of the cylinder 25 and of the closure members 26 is coated with a suitable high energy gamma ray-reactive material 29, such as a compound of deuterium or beryllium-9. However, as previously indicated, instead of coating the interior surface of the cathode envelope, the envelope may contain the reactive substance in gaseous form.

In any case, the cathode envelope is filled with a relatively low density ionizable gas, such as hydrogen, methane, argon, etc.

In the foregoing description of the cathode cylinder, reference has been made to constructing it from brass. However, it is contemplated that other metals may be used, including aluminum, copper, steel, iron, etc. For the detection of very high energy rays of 11.1 m. e. v., the cathode cylinder may be made of aluminum, in which case no inside coating of gamma ray-reactive material is required since aluminum itself is reactive to gamma rays of this energy. Other suitable metals of construction may be used in a like manner for the detecting of high energy rays having an energy corresponding to the release energy of the material.

In operation, the housing 13 is passed through the hole 10 by means of cable 14 and the depth of the instrument is noted simultaneously with the indication of the meter or the recorder 16. During passage through the hole, gamma rays of sufficiently high energy level emanating from the surrounding strata react with the substance in the coating 29, thereby releasing particles having high ionizing power. The released particles cause ionization of the gaseous filling and under the influence of the electrical field, electrical discharges or pulses are created within the detector. The resulting electrical impulses are transmitted from the detector through the cable 14 to the amplifier and recording mechanism located at the surface.

As previously mentioned, gamma rays of insufficient energy to produce photo-disintegration can eject some electrons into the volume of the counter. The size of the discharges caused by these low energy rays is small and by means of the amplifiers 19 and 15, a selective determination of the discharges can be made. In other words, only those discharges or pulses created by the gamma rays of selected high energy level can be recorded by the instrument 16.

Although a proportional-type of counter is preferred and has been described in the foregoing description, nevertheless it is contemplated that fast ionization chambers and scintillation counters may be employed.

It is also contemplated that the invention may have application in surface surveying or exploration rather than in exploring a well bore as has been specifically described above.

Obviously many modifications and variations of the invention, as hereinbefore set forth, may be made without departing from the spirit and scope thereof and, therefore, only such limitations should be imposed as are indicated in the appended claims.

I claim:

1. A method of selectively detecting gamma rays having energies above a predetermined level and occurring in the presence of other gamma rays having lower energies comprising the steps of: exposing to all of said rays a substance which interacts selectively with gamma rays above said level to produce heavy, positively-charged, strongly-ionizing particles but does not so interact with gamma rays below it; causing said ionizing particles to come into contact with an ionizable gas in an electrical field of suitable intensity to produce relatively stronger discharge impulses for electron avalanches started by the strongly ionizing heavy particles than for any which may be started by electron by-products of gamma rays; and applying all of said impulses to an amplitude-sensitive electrical circuit to separate the stronger impulses from the weaker.

2. In the exploration of an earth formation from which gamma rays of different energy levels may emanate, the method of selectively detecting gamma rays having energies above a predetermined level comprising the steps of: exposing to the emanations from said formation a substance which interacts selectively with gamma rays above said level to produce heavy, positively-charged, strongly-ionizing particles but which does not so interact with gamma rays below it; causing said ionizing particles to come into contact with an ionizable gas in an electrical field of suitable intensity to produce relatively stronger discharge impulses for electron avalanches started by the strongly ionizing heavy particles than for any which may be started by electron by-products of gamma rays, whereby all of said impulses may be applied to an amplitude-sensitive electrical circuit for separating the stronger ones from the weaker.

3. A gamma ray detector comprising an envelope containing an anode having an electron-receiving surface of relatively very small area; a cathode having a surface of relatively very large area and in cooperative spaced relationship with said electron-receiving surface; said large and small area surfaces defining a discharge space and facing each other thereacross; an ionizable gaseous atmosphere in said discharge space between said surfaces of the said cathode and anode; a source of potential connected between said cathode and anode to establish between said surfaces an electric field of such intensity that the detector operates as a proportional counter; and a substance included in the structure of the cathode, which interacts selectively with gamma rays having energies above a predetermined level to produce heavy, positively-charged, strongly-ionizing particles.

4. A detector as in claim 3 in which said substance comprises a coating carried on at least a part of said surface of the cathode.

5. A detector as in claim 4 in which said coating comprises atoms of deuterium.

6. A detector as in claim 4 in which said coating comprises atoms of beryllium-9.

7. A detector as in claim 3 in which said substance comprises aluminum atoms.

8. A detector as in claim 3 and further comprising an amplitude-sensitive electrical circuit for receiving impulses from said anode and for separating out from them any ones thereof of more than a predetermined magnitude.

References Cited in the file of this patent
UNITED STATES PATENTS

| Number | Name | Date |
|---|---|---|
| 2,481,964 | Wollan | Sept. 13, 1949 |
| 2,508,772 | Pontecorvo | May 23, 1950 |

OTHER REFERENCES

Review of Scientific Instruments, December 1936, vol. 7, pages 441–449.